(12) United States Patent
Tse

(10) Patent No.: US 10,606,102 B2
(45) Date of Patent: Mar. 31, 2020

(54) MAGNETIC CONNECTION STRUCTURE OF A SPECTACLE FRAME FOR SOLID CONNECTION

(71) Applicant: Chun Ip Tse, Hong Kong (CN)

(72) Inventor: Chun Ip Tse, Hong Kong (CN)

( * ) Notice: Subject to any disclaimer, the term of this patent is extended or adjusted under 35 U.S.C. 154(b) by 56 days.

(21) Appl. No.: 15/757,865

(22) PCT Filed: May 12, 2017

(86) PCT No.: PCT/CN2017/084075
§ 371 (c)(1),
(2) Date: Mar. 6, 2018

(87) PCT Pub. No.: WO2017/202215
PCT Pub. Date: Nov. 30, 2017

(65) Prior Publication Data
US 2018/0329233 A1  Nov. 15, 2018

(30) Foreign Application Priority Data
May 24, 2016 (CN) ...................... 2016 2 0478846 U

(51) Int. Cl.
*G02C 5/22* (2006.01)
*G02C 9/02* (2006.01)
(Continued)

(52) U.S. Cl.
CPC ................ *G02C 9/02* (2013.01); *G02C 5/02* (2013.01); *G02C 5/16* (2013.01); *G02C 5/2209* (2013.01);
(Continued)

(58) Field of Classification Search
CPC ........ G02C 2200/02; G02C 5/22; G02C 9/02; G02C 5/16; G02C 5/2254; G02C 5/2218; G02C 5/2209
(Continued)

(56) References Cited

U.S. PATENT DOCUMENTS 6,217,170 B1 * 4/2001 Hsiao ...................... G02C 5/22
16/228
7,794,080 B2 * 9/2010 Zelazowski .......... G02C 5/2209
16/228
(Continued)

FOREIGN PATENT DOCUMENTS

CN          2435756 Y      6/2001
CN        203882032 U     10/2014
(Continued)

*Primary Examiner* — Hung X Dang
(74) *Attorney, Agent, or Firm* — Muncy, Geissler, Olds & Lowe, PC

(57) ABSTRACT

This utility model discloses a magnetic connection structure of an eyewear for solid connection, comprising a front connecting portion and a temple connecting portion. The inner side of the front connecting portion is provided with an upper hinge having an upper hinge groove with a downward opening; the upper portion of the outer side of the front connecting portion is provided with an one step lower snap fit. The temple connecting portion comprises a temple connecting piece, a magnetic connecting piece and a lower hinge, wherein said magnetic connecting piece is fastened to the lower hinge, the front end of said temple connecting piece is provided with an elastic piece and a fixing piece, said elastic piece matches the snap fit, and the fixing piece is connected to the lower hinge. This utility model adds protection of the magnet core, the temples and the front would not detach, the temples are elastic and easy to assemble and disassemble. The entire structure is simple, firmly connected, not easy to break and thus highly reliable.

9 Claims, 4 Drawing Sheets

(51) Int. Cl.
*G02C 5/02* (2006.01)
*G02C 5/16* (2006.01)

(52) U.S. Cl.
CPC ....... *G02C 5/2254* (2013.01); *G02C 2200/02* (2013.01)

(58) Field of Classification Search
USPC ............................................ 351/153; 16/228
See application file for complete search history.

(56) References Cited

U.S. PATENT DOCUMENTS

| | | | |
|---|---|---|---|
| 2007/0146626 A1* | 6/2007 | Rossin ..................... | G02C 5/22 351/153 |
| 2012/0062831 A1* | 3/2012 | Sierra .................. | G02C 5/2209 351/121 |
| 2014/0059803 A1* | 3/2014 | Kidouchim .............. | G02C 5/22 16/228 |

FOREIGN PATENT DOCUMENTS

| | | |
|---|---|---|
| CN | 205157906 U | 4/2016 |
| CN | 205720936 U | 11/2016 |

* cited by examiner

MAGNETIC CONNECTION STRUCTURE OF A SPECTACLE FRAME FOR SOLID CONNECTION

TECHNICAL FIELD

This utility model relates to the field of eyewear, and specifically relates to a magnetic connection structure of an eyewear for solid connection.

BACKGROUND ART

For traditional glasses, the front and the temples are fastened by screws. However, in a screw structure, the thread would easily strip and render the connection insecure. After screws are used for connection, they cannot be removed, and the optical frame and temples cannot be separated. Therefore, if one part of the eyewear needs to be replaced, it has to be replaced together with the optical front and the temples.

One solution is to use fronts and temples connected with magnets. However, in existing magnetic connection structures, there is no protective structure for the magnets. Because of their fragile texture, the magnets could be easily broken or damaged. When the fronts or temples are relatively heavy, the magnetic connection alone cannot ensure firm connection between the fronts and temples, which may easily get loose. As a result, the connection is not firm, the structure is sturdy and has low reliability. Besides, when the existing temples are unfolded to a linear state, they cannot be further bent, which causes discomfort for wearing.

Due to the aforesaid defects, improvements should be made.

Contents of the Utility Model

To overcome the defects in the prior art, this utility model provides a magnetic connection structure of an eyewear for solid connection The technical solution of this utility model is as follows:

a magnetic connection structure of an eyewear for solid connection, characterized in comprising a front connecting portion and a temple connecting portion, said front connecting portion including a front connecting piece, the inner side of which is provided with a rectangular stainless iron upper hinge having an upper hinge groove with a downward opening, the upper portion of the outer side of the front connecting portion is provided with a one-step lower snap fit, said temple connecting portion comprising a temple connecting piece, a magnetic connecting piece and a lower hinge, wherein said magnetic connecting piece includes a metal protective shell and a magnet core disposed inside said metal protective shell, said magnetic connecting piece is fastened to the lower hinge, the protruding upper portion thereof matching the upper hinge groove; the front end of said temple connecting piece is provided with an elastic piece and a fixing piece that are separated from each other, said elastic piece matching said snap fit, said fixing piece being connected to the lower hinge.

Further, a fork groove is disposed between the elastic piece and the fixing piece.

Further, the inner side of the elastic piece is provided with a sliding groove that is outwardly recessed.

Further, the front edge of the lower hinge forms a plane that is perpendicular to the elastic piece.

Further, the lower hinge is provided with a lower hinge groove having an upward opening, and the metal protective shell is fixed in the lower hinge groove.

Further, the metal protective shell and the lower hinge are integrally formed.

Further, an inner bezel inclining inwardly is provided at the connection of the fixing piece and the lower hinge.

Still further, an outer bezel inclining outwardly is provided at the connection of the elastic piece and the temple connecting piece.

Still further, an outer bezel inclining outwardly is provided on the inner side of the connection of the elastic piece and the temple connecting piece, and the outer side thereof is at the same plane as that of the temple connecting piece.

The advantageous effects of this utility model according to the aforesaid solution lie in: in this utility model, the magnetic connection structure connects more tightly to the upper and lower hinges while making it easier to disassemble the front and the temples; the metal protective shell has an additional protective effect on the magnet core and increases the flexure strength of the magnet core; the elastic piece and the snap fit work together to make unfolding smoothly, would not fall off and facilitate assembly and disassembly; the front edges of the rectangular upper and lower hinges can both make the appearance more streamlined and aesthetic and avoid damaging the frame or lens; the overall structural is simple, and the connection is firm, sturdy and therefore highly reliable.

In the figures, 100. a front connecting portion;
110. an upper hinge;
120. a front connecting piece;
121. a snap fit;
200. a temple connecting portion;
210. a temple connecting piece;
211. an elastic piece;
212. a fixing piece;
213. a fork groove;
214. an outer bezel;
215. an inner bezel;
216. a sliding groove;
220. a lower hinge;
221. a front edge;

230. a magnetic connecting piece;
231. a magnet core;
232. a metal protective shell;
233. a lower hinge groove.

EMBODIMENTS

Figure 1:
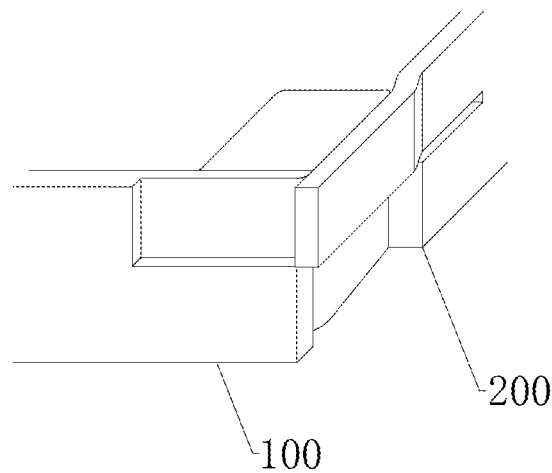
FIG. 1 is a schematic view of this utility model in a bent state.
Figure 2:
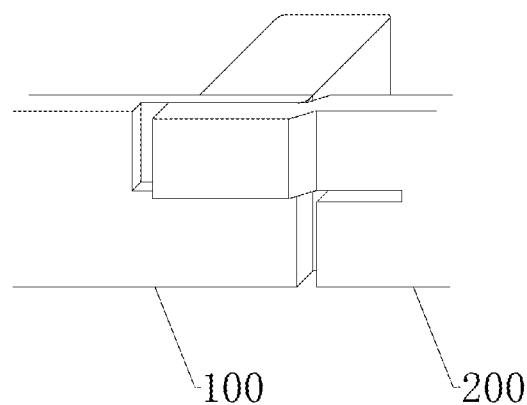
FIG. 2 is a schematic view of this utility model after snap-fit.

In light of the drawings and embodiments, this utility model is further described as follows:

As shown in FIGS. 1-2, a magnetic connection structure of an eyewear for solid connection comprises a front connecting portion 100 and a temple connecting portion 200.

Figure 3:
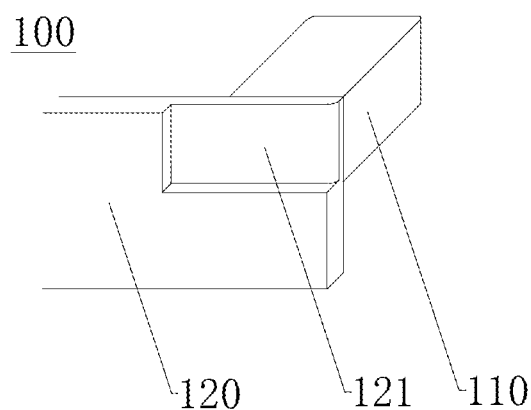
FIG. 3 is a schematic view of the front connecting portion in this utility model.

As shown in FIG. 3, the front connecting portion 100 comprises a front connecting piece 120, the inner side of which is provided with a rectangular stainless iron upper hinge 110; the upper portion of the outer side of the front connecting portion 100 is provided with an one step lower snap fit 121.

Figure 4:
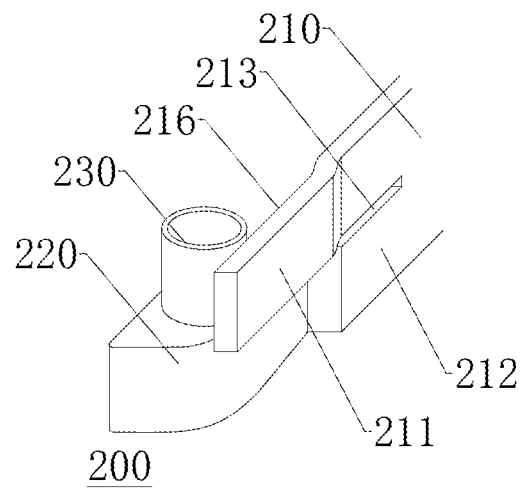
FIG. 4 is a schematic view of the temple connecting portion in this utility model.
Figure 5:
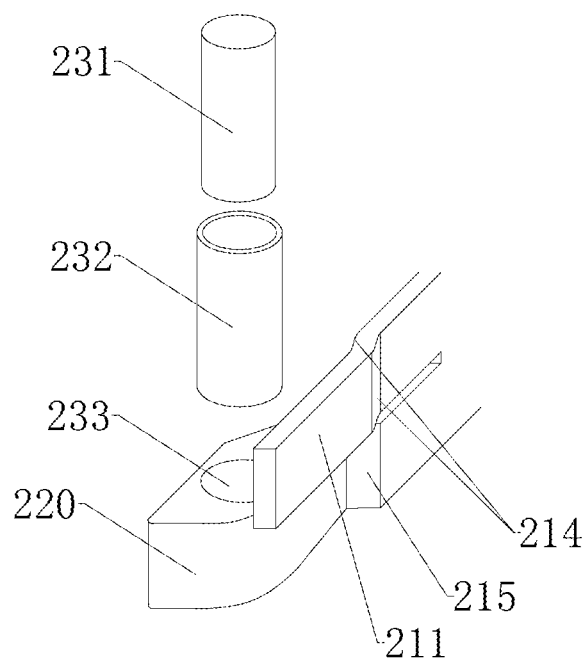
FIG. 5 is an exploded view of the temple connecting portion in this utility model.
Figure 6:
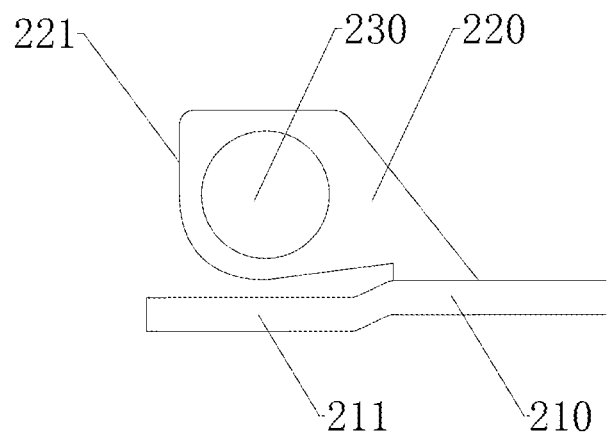
FIG. 6 is a plan view of the temple connecting portion in this utility model.

As shown in FIGS. 4-6, the temple connecting portion 200 comprises a temple connecting piece 210, a magnetic connecting piece 230 and a lower hinge 220; the magnetic connecting piece 230 is fastened to the lower hinge 220, and the upper portion of the magnetic connecting piece 230 matches the upper hinge 110.

The magnetic connecting piece 230 includes a metal protective shell 232 and a magnet core 231 disposed inside said metal protective shell 232. The use of the magnet core 231 helps avoid the inconveniences caused by the traditional hinge screw structure, e.g., the screw gets loose, the connection is not firm, and the broken screw cannot be removed. The metal protective shell 232 reinforces the magnet core 231 and ensures the durability of the magnet core 231.

In one embodiment, the lower hinge 220 is provided with a lower hinge groove 233 having an upward opening, the metal protective shell 232 is fixed within the lower hinge groove 233. In another embodiment, the metal protective shell 232 and the lower hinge 220 are integrally formed.

The front end of the temple connecting piece 210 is provided with an elastic piece 211 and a fixing piece 212 that are separated from each other. A fork groove 213 is placed between the elastic piece 211 and the fixing piece 212. The inner side of the elastic piece 211 is provided with a sliding groove 216 that is outwardly recessed. The elastic piece 211 matches the snap fit 121. The fixing piece 212 is connected to the lower hinge 220, and the front edge 221 of the lower hinge 220 forms a plane that is perpendicular to the elastic piece 211.

When the elastic piece 211 fits in the snap fit 121, the temple connecting portion 200 when unfolded, would not be separated from the front connecting portion 100. The separation only occurs when the temple connecting portion 200 is folded. The magnet core 231 ensures that the temple connecting portion 200 does not detach when folded. In this way, the assembly and disassembly processes become easier, and the whole structure is handy and stable. Besides, the elastic piece 211 and the snap fit 121 work together to make the entire surface approximate the same level when the temple connection piece 210 is unfolded, making the design of the temple connecting piece 210 and the front connecting piece 120 more diversified. The elastic piece 211 imparts a certain degree of outward elasticity to the temple connecting piece 210, while the snap fit 121 is used to restrict the angle of extending outwards to avoid damaging the temple connecting piece 210 under excessive force.

Figure 7:
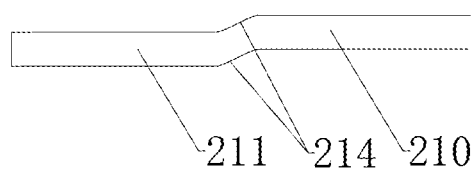
FIG. 7 is a plan view of an embodiment of the temple connecting piece in this utility model.
Figure 8:
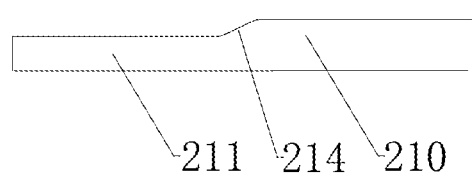
FIG. 8 is a plan view of another embodiment of the temple connecting piece in this utility model.

As shown in FIGS. 7-8, an inner bezel 215 inclining inwardly is provided at the connection between the fixing piece 212 and the lower hinge 220. In one embodiment, an outer bezel 214 inclining outwardly is provided at the connection between the elastic piece 211 and the temple connecting piece 210. In another embodiment, an outer bezel 214 inclining outwardly is provided at the inner side of the connection between the elastic piece 211 and the temple connecting piece 210, and the outer side thereof is at the same plane as that of the temple connecting piece 210.

Figure 9:
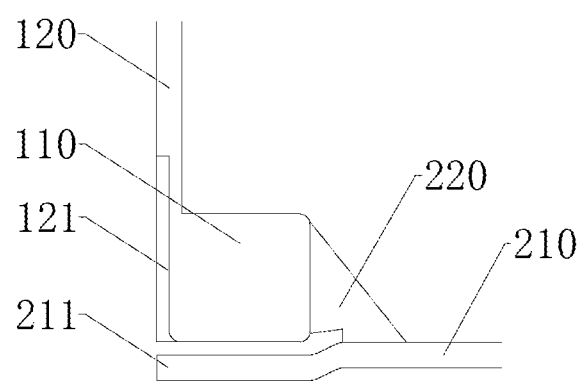
FIG. 9 is a plan view of this utility model in a bent state.
Figure 10:
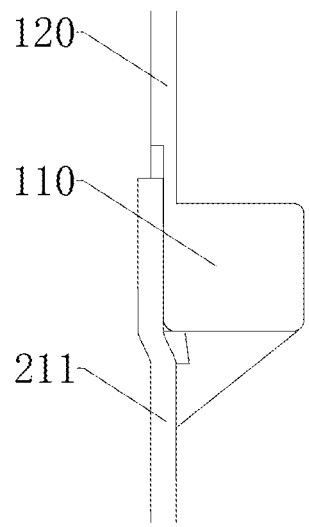
FIG. 10 is a plan view of this utility model in a snap-fit state.
Figure 11:
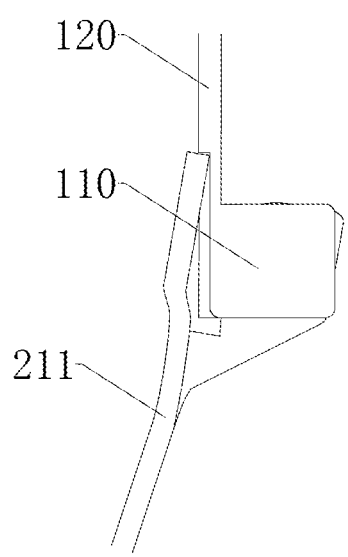
FIG. 11 is a plan view of this utility model under excessive force.

As shown in FIGS. 9-11, the rectangular shape of the upper hinge 110 allows the front connecting portion 100 and the temple connecting portion 200, when folding and unfolding, to press the convex elastic piece 211, such that the folding and unfolding process goes smoothly with no parts getting loose. The front edge 221 of the lower hinge 220 forms a plane that is perpendicular to the elastic piece 211, which enables close contact and coordination and prevents the temple connecting portion 210 from rocking. The front edges 221 of the rectangular upper hinge 220 and lower hinge 220 can both make the appearance more streamlined and attractive and could avoid damaging the frame or lens.

It should be understood that a person of ordinary skill in the art could improve or change the structure according to the aforesaid description, but such improvements and changes all come within the protection scope of the claims of this utility model.

The foregoing description of this patent for utility model in light of the drawings is exemplary. Obviously, the realization of this patent for utility model is not limited to the above-mentioned embodiments. Various improvements made using the concept and technical solution of this patent for utility model, or direct applications of the concept and technical solution of this patent for utility model without improvement to other occasions all fall within the protection scope of this utility model.

The invention claimed is:

1. A magnetic connection structure of an eyewear for solid connection, characterized in comprising a front connecting portion and a temple connecting portion, said front connecting portion including a front connecting piece, the inner side of which is provided with a rectangular stainless iron upper hinge, the upper portion of the outer side of the front connecting portion is provided with a one-step lower snap fit, said temple connecting portion comprising a temple connecting piece, a magnetic connecting piece and a lower hinge, wherein said magnetic connecting piece includes a metal protective shell and a magnet core disposed inside said metal protective shell, said magnetic connecting piece is fastened to the lower hinge, the upper portion of the magnetic connecting piece matching the rectangular stainless iron upper hinge, the front end of said temple connecting piece is provided with an elastic piece and a fixing piece that are separated from each other, said elastic piece matching said snap fit, and said fixing piece being connected to the lower hinge.

2. The magnetic connection structure of an eyewear for solid connection according to claim 1, characterized in that a fork groove is disposed between the elastic piece and the fixing piece.

3. The magnetic connection structure of an eyewear for solid connection according to claim 1, characterized in that the inner side of the elastic piece is provided with a sliding groove which is outwardly recessed.

4. The magnetic connection structure of an eyewear for solid connection according to claim 1, characterized in that the front edge of the lower hinge forms a plane perpendicular to the elastic piece.

5. The magnetic connection structure of an eyewear for solid connection according to claim 1, characterized in that the lower hinge is provided with a lower hinge groove having an upward opening, and the metal protective shell is fastened in the lower hinge groove.

6. The magnetic connection structure of an eyewear for solid connection according to claim 1, characterized in that the metal protective shell and the lower hinge are integrally formed.

7. The magnetic connection structure of an eyewear for solid connection according to claim 1, characterized in that an inner bezel inclining inwardly is provided at the connection of the fixing piece and the lower hinge.

8. The magnetic connection structure of an eyewear for solid connection according to claim 7, characterized in that an outer bezel inclining outwardly is provided at the inner side of the connection of the elastic piece and the temple connecting piece, the outer side thereof is positioned in the same plane as that of the temple connecting piece.

9. The magnetic connection structure of an eyewear for solid connection according to claim 1, characterized in that an outer bezel inclining outwardly is provided at the connection of the elastic piece and the temple connecting piece.

\* \* \* \* \*